United States Patent [19]

Nuwordu

[11] Patent Number: 5,421,384
[45] Date of Patent: Jun. 6, 1995

[54] UNLIMITED WIDTH DOVETAILING SYSTEM WITH OVERHEAD CLAMP

[76] Inventor: Alexander A. Nuwordu, P.O. Box 11544, Richmond, Va. 23230-1554

[21] Appl. No.: 186,584

[22] Filed: Jan. 26, 1994

[51] Int. Cl.⁶ .............................................. B27M 3/00
[52] U.S. Cl. ............................... 144/144.5 R; 144/87;
144/144.5 GT; 144/372; 269/148; 269/166;
269/95; 269/221
[58] Field of Search ................. 269/95, 147, 148, 149,
269/166, 221; 144/84, 85, 87, 144 R, 144.5,
144.5 GT, 372

[56] References Cited

U.S. PATENT DOCUMENTS

| | | |
|---|---|---|
| 886,613 | 8/1898 | Krogh . |
| 1,194,666 | 8/1916 | Romanowski . |
| 2,764,191 | 9/1956 | Hartmann . |
| 3,109,466 | 11/1963 | Jones . |
| 3,272,244 | 9/1966 | Nemec ................................. 144/87 |
| 3,800,840 | 4/1974 | McCord, Jr. . |
| 3,834,435 | 9/1974 | McCord, Jr. . |
| 3,878,875 | 4/1975 | McCord, Jr. . |
| 4,168,730 | 9/1979 | Keller . |
| 4,373,562 | 2/1983 | Vernon . |
| 4,405,004 | 9/1983 | Dicke . |
| 4,407,344 | 10/1983 | Dicke . |
| 4,428,408 | 1/1984 | Grisley . |
| 4,462,440 | 7/1984 | Dolfi . |
| 4,607,673 | 8/1986 | McCord, Jr. . |
| 4,648,433 | 3/1987 | Wolff . |
| 4,875,510 | 10/1989 | Muellers ......................... 144/144 S |
| 4,989,847 | 2/1991 | Chapman . |
| 5,192,060 | 3/1993 | Novak ................................. 269/147 |
| 5,330,216 | 7/1994 | Schnell ................................ 269/166 |

*Primary Examiner*—W. Donald Bray
*Attorney, Agent, or Firm*—Shoemaker and Mattare, Ltd.

[57] ABSTRACT

An unlimited width dovetailing system for holding a workpiece and guiding a router while cutting dovetails in an upper edge of the workpiece includes a base plate with a pair of blocks attached thereto, and a beam which rests on the base plate, abutting against the blocks. A dovetail template for a router is affixed to the beam, which can be turned end-for-end to expose either side of the template to the workpiece.

An overhead clamping mechanism for holding the workpiece in a vertical plane against a front face of the beam includes a pair of bars each having a fixed jaw pivotally bearing against a respective one of said blocks and having an offset which extends over the workpiece's upper edge, a pair of movable jaws, one on each of the bars, an elongate clamping member extending between the jaws, and a pair of clamping screws, each passing through a threaded hole in its respective jaw and into said elongate member.

11 Claims, 3 Drawing Sheets

UNLIMITED WIDTH DOVETAILING SYSTEM WITH OVERHEAD CLAMP

BACKGROUND OF THE INVENTION

This invention relates generally to woodworking and cabinet making, and more particularly to a dovetailing system.

Dovetail joints, once tediously cut with a saw and a chisel by hand only by skilled craftsmen, are now easily produced with a router and a dovetailing template which guides the router precisely. With a little practice, the average man can produce very decent dovetail joints this way.

With typical prior devices, a board or panel is set on edge and clamped against a table or fixture to which the dovetailing template is attached. The clamps, placed on either side of the board or panel, limit sideways movement of the workpiece, and thus limit the length of the dovetail that is produced. In order to enable people to cut very long dovetail joints, it would be desirable to have a dovetail apparatus that did not limit sideways movement of the workpiece, that is, one in which the clamping mechanism lay wholly outside of the path of the workpiece.

SUMMARY OF THE INVENTION

An object of the invention is to enable a person to cut dovetails along very long workpieces with a router, while the workpiece is held in a vertical plane against a table supporting a routing template.

Another object is to enable one to produce dovetails of unlimited length with a short, standard routing template.

A further object of the invention is to facilitate setup of a routing template with respect to a workpiece, and to eliminate the need for repetition of certain setup steps.

These and other objects are attained by an unlimited width dovetailing system including a base plate with a pair of blocks attached thereto, and a beam which rests on the base plate, abutting against the blocks. A dovetail template for a router is affixed to the beam, which can be turned end-for-end to expose either side of the template to the workpiece.

A clamping mechanism for holding the workpiece in a vertical plane against a front face of the beam includes a pair of overhead clamp bars, each having, at one end, a fixed jaw whose toe pivots against a respective one of said blocks. The bar extends over the workpiece's upper edge. A movable jaw is mounted on each of the bars, and a tubular clamping member extends parallel to the workpiece, between the jaws. Each jaw has a threaded boss which receives a clamping screw, whose free end is retained within the tubular clamping member.

An advantage of the invention is that, since the clamp bars pass over the workpiece, rather than around it, the length of dovetails which can be produced is limited only by the size of the workpiece and available shop space. This and other advantages of the invention will be apparent from the following description of the best mode of practicing this invention.

BRIEF DESCRIPTION OF THE DRAWINGS

In the accompanying drawings.

DESCRIPTION OF THE PREFERRED EMBODIMENT

Figure 1:
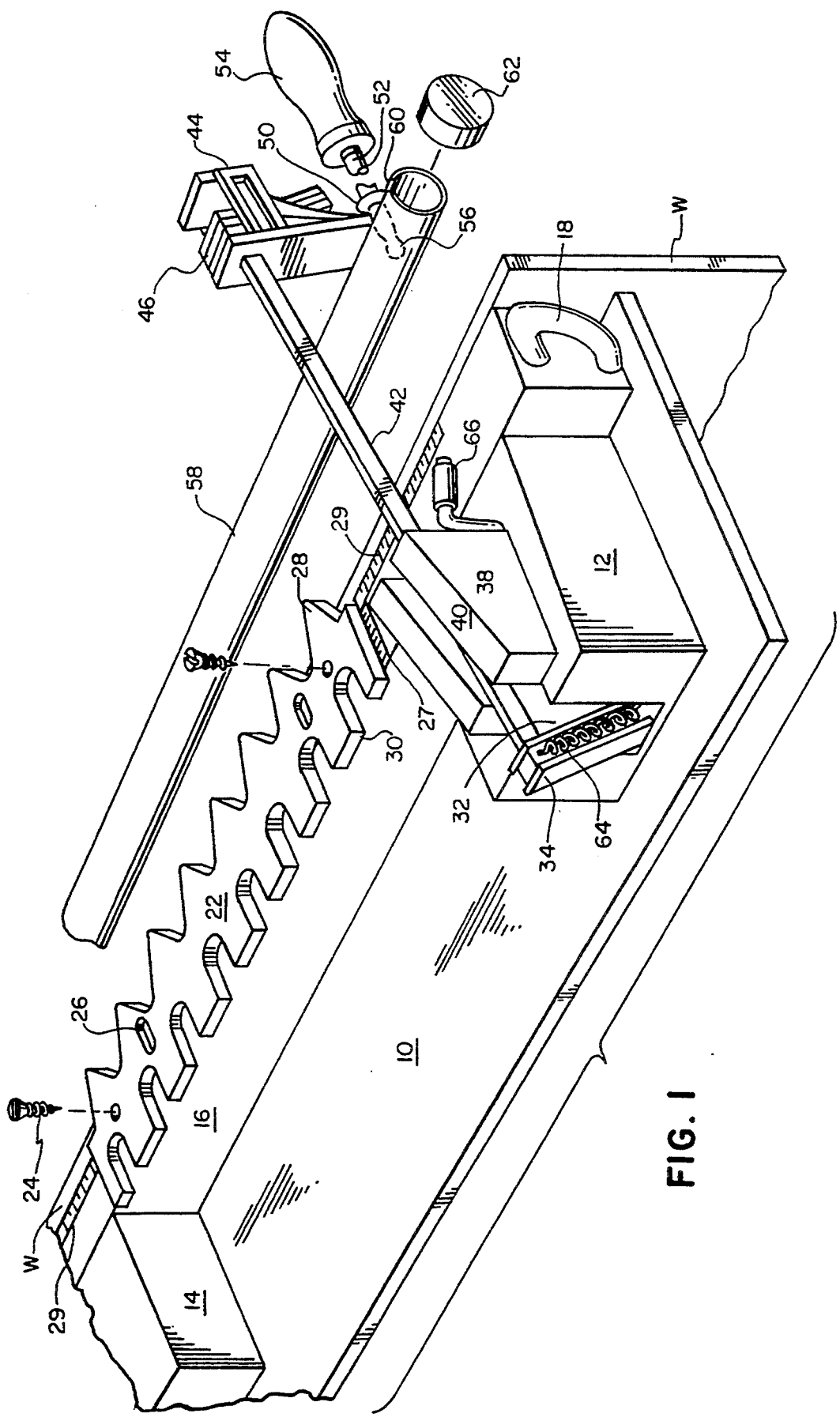
FIG. 1 is a perspective view of an unlimited width dovetailing device embodying the invention, seen looking toward the cabinet maker.
Figure 2:
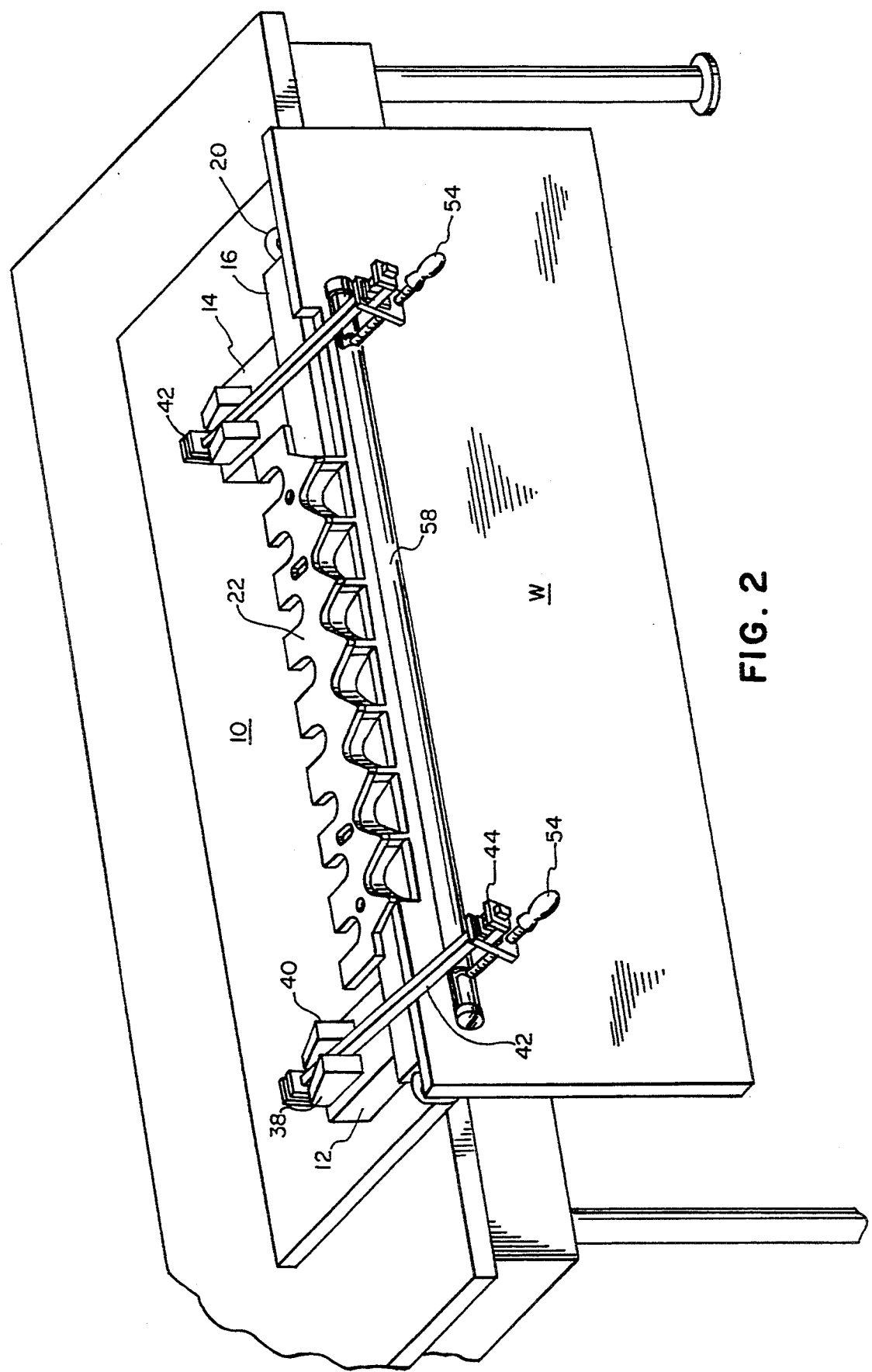
FIG. 2 is a view of the device from the perspective of the cabinet maker.

An apparatus embodying the invention includes a base plate 10 which is clamped or bolted to a table, as shown in FIGS. 1 and 2. A pair of blocks 12, 14 are secured to the base plate by high-strength means such as adhesive and/or bolts (not shown). The blocks provide abutments for the ends of a long beam 16 of wood, aluminum or other strong material. The beam has a rectangular cross-section. The presently preferred beam is three feet long, and has a height of three and a half inches and a thickness of two and three-quarters inches; however, these dimensions do not appear to be critical and it is expected that they may be changed, depending on the size and nature of the work being done. Handholds 18, 20 are affixed to either end of the beam, to facilitate moving it. The handholds shown resemble the handle on a jointer plane, but the exact shape of the handhold should be a matter of design choice.

A routing template 22 is temporarily affixed, initially, to the top surface of the beam by means of screws (not shown) passed through slots 26 in the template. The slots extend widthwise of the beam, so that the template can be moved toward and away from the workpiece W. The template can be accurately positioned on the beam with the aid of two short transverse scales 27 marked on or affixed to the upper surface of the beam, on either side of the template. Notches 29 on either side edge of the template are used, in conjunction with the scales, to ensure the template is parallel to the beam, and to adjust its front-to-rear depth of the template installation, before the screws 24 are installed.

A long scale 29, running lengthwise of the beam, is also provided on the top surface of the beam. This scale, which runs along the top edge of the beam, is used as a reference when adjusting the workpiece, for example to insure the proper fitting of corners in the finished product. Because the beam can be reversed, duplicate scales may be provided, on both top edges of the beam.

The template 22 is otherwise of conventional design, having a series of equally spaced teeth on either side. The teeth 28 on one side are tapered, while those 30 on the other side have parallel edges. As shown in the drawings, the tapered teeth are facing the cabinet maker, but this is fortuitous, since the beam may be turned end-for-end, exposing the opposite side of the template, when it is desired to make the straight cuts. As one familiar with dovetailing jigs will appreciate, the sides of the teeth serve as guides for a collar on the base of a router used to cut dovetail slots in the workpiece. A number of the patents mentioned above provide further instruction.

Each block is about as high as the beam that abuts against it. The blocks 12,14 are identical; therefore, only one (12) is described in detail. The block has a recess 32 on the side facing away from the cabinet maker (the side visible in FIG. 1). The block is symmetrical about a center plane "P", astride which a pair of vertical guides 38,40 are affixed to, or formed integrally with, the upper surface of the block. The space between the guides laterally restrains a clamping bar 42, made of bar stock, that is welded to the upper end of a fixed jaw 34 whose toe pivots in the recess 32. The bar passes above the workpiece, and through a sliding jaw 44 installed on its free end. The sliding jaw contains a stack of metal plates 46 having rectangular apertures only slightly higher than the bar stock; these plates are spring-biased to an oblique position (illustrated) in which they bind on the bar and prevent movement of the jaw along it. They operate as a latch. When the lower, exposed ends of the plates are depressed with the thumb, the plates move to a position substantially normal to the length of the bar stock leg, so that there is no binding and the jaw can be moved.

The bottom end of the jaw has a threaded boss 50 which receives a clamping screw 52 provided with a large handle 54, resembling that of a screwdriver. The free end of the screw has an enlarged rounded tip 56 that is normally retained inside a one-inch diameter aluminum tube 58 which delivers the clamping force to the workpiece. A J-slot 60 at either end of the tube allows for removal of the screw; this slot may normally be covered by a plastic end cap 62.

The tube 58 distributes the force from the screws to the surface of the workpiece, which is sandwiched between the tube and the bar 16 on the far side. The handles allow the cabinet maker not only to tighten the clamp, but also, when the clamp is loosened, to lift it, although the tension spring 64 illustrated, extending between either crank and its respective block, provides more than enough force to counterbalance the weight of the clamp mechanism. This automatic raising improves access to the workpiece.

The L-shaped keeper 66 shown may be turned from the position illustrated to a position wherein its upper leg overlies the bar stock to hold the clamp down.

Figure 3:
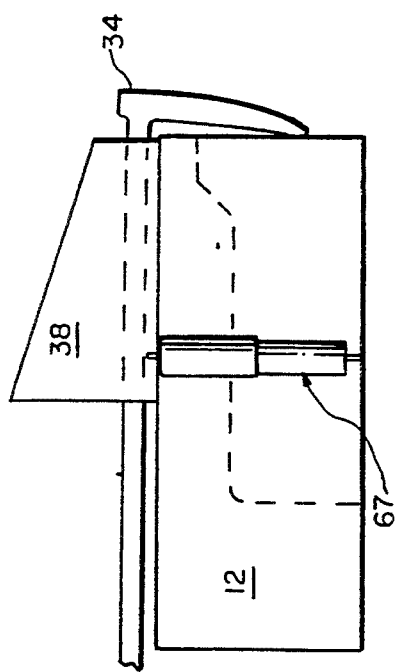
FIGS. 3 and 4 show a first modified form of the invention.
Figure 4:
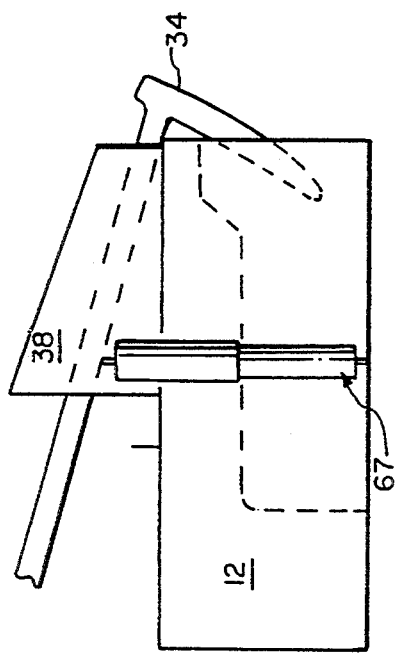

FIGS. 3–4 show a modification, wherein the coil springs of FIGS. 1–2 have been replaced by a pneumatic spring 67. Details of such a devices, comprising a cylinder containing a piston and a volume of gas progressively compressed by the piston, are well known. Thus the spring 67 is depicted only generally.

Figure 5:
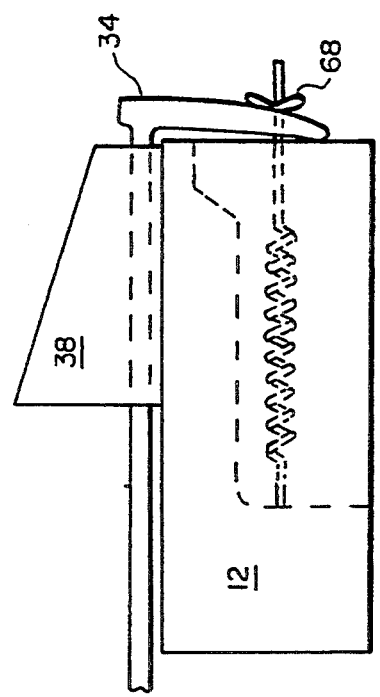
FIGS. 5 and 6 show a second modified form thereof.
Figure 6:
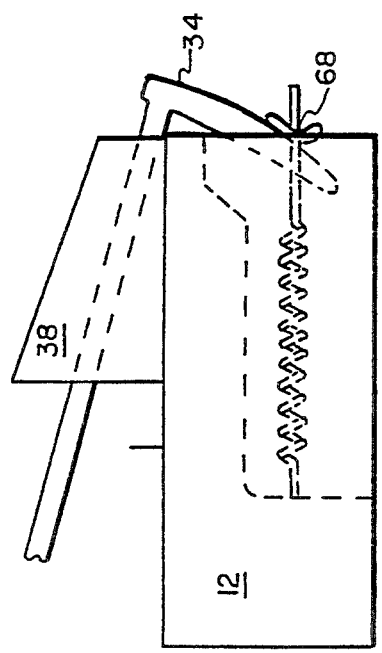

FIGS. 5–6 show another modified form of the invention, once again employing coil springs in tension, this time, however, disposed within the block, and also including an adjuster 68 in the form of a wing nut, to alter spring tension. The pivot point in this instance is near the point of intersection of the bar and the fixed jaw.

In use, the base plate is clamped or, preferably, permanently bolted to a table, and the beam is placed against the blocks. The template is then preliminarily attached to the beam by screws passed through the template's slots, which allow for fine adjustment of the template with respect to the workpiece. When the template has been properly positioned, with assistance of the scales 27, permanent screws are inserted through the holes into the beam.

Now, after using the scale 29 to adjust one vertical edge of the workpiece with respect to the template, the workpiece is clamped against the beam by lowering the clamp and twisting the handles clockwise. We prefer, at this stage, to trace along a few of the template's teeth with a pencil, marking the top edge of the workpiece so that when it is subsequently moved, it can be properly indexed with respect to the template, thus preserving the correct pitch between cuts. A person familiar with using a dovetailing jig will know how to set up the router, adjust the cutting depth, and so on.

After the template has been secured, a router is run along the template's teeth to cut slots into the edge of the workpiece. After most of the slots defined by the template have been cut, the clamping tube is released and lifted, and the workpiece is moved sideways and clamped again. The woodworker aligns the teeth of the template with the marks previously made, or with the slots just cut, and continues the dovetailing. The workpiece is moved as many times as necessary, without limit, since the clamping arrangement does not interfere with the edges of the board. The length of the dovetail is therefore theoretically infinite, but in practice limited by shop space.

Since the invention is subject to modifications and variations, it is intended that the foregoing description and the accompanying drawings shall be interpreted as illustrative of only one form of the invention, whose scope is to be measured by the following claims.

I claim:

1. An apparatus for holding a workpiece and guiding a router while cutting dovetails in an upper edge of the workpiece, said apparatus comprising a base plate for attachment to a stationary fixture,
   a pair of blocks attached to the base plate,
   a beam which rests on the base plate, said beam having a rear face abutting against the blocks,
   a dovetail template for a router, said template being affixed to said beam, and
   an overhead clamping mechanism for holding a workpiece in a vertical plane against a front face of said beam, said mechanism including a pair of bars each having a fixed jaw pivotally bearing against a respective one of said blocks and having an offset portion which extends over the workpiece's upper edge, a pair of movable jaws, one on each of said bars, an elongate clamping member extending between the movable jaws, and a pair of clamping screws, each passing through a threaded hole in its respective jaw and into said elongate member,
   whereby one can lower the clamping member over the workpiece edge, move the jaws on the bars until the clamping member strikes the workpiece, and then turn each screw to increase the clamping force on the workpiece.

2. The invention of claim 1, wherein each of said movable jaws has a releasable means for locking the jaw in any desired position on its bar.

3. The invention of claim 1, wherein said beam has a handle on at least one of its ends, to facilitate handling the beam.

4. The invention of claim 1, wherein the beam and the blocks have approximately equal heights.

5. The invention of claim 1, wherein the elongate clamping member is hollow, and each of said clamping screws has an enlarged free end retained within the clamping member.

6. The invention of claim 5, wherein said elongate member has, at either end, a J-shaped slot into which the enlarged free end of the respective screw is inserted laterally.

7. The invention of claim 6, further comprising a pair of caps, each having a friction fit over a respective one of the ends of the hollow elongate clamping member.

8. The invention of claim 1, further comprising means for biasing the bars upward with sufficient force to overcome the weight of the clamping mechanism, whereby the clamping mechanism raises automatically when it is released.

9. The invention of claim 8, wherein said biasing means is a pneumatic spring.

10. The invention of claim 8, wherein said biasing means is a tension spring.

11. The invention of claim 10, wherein said bar has a pivot point on said block, and said spring is connected between said block and a point on said bar away from said pivot point.

* * * * *